United States Patent
Kim et al.

(10) Patent No.: US 9,410,851 B2
(45) Date of Patent: Aug. 9, 2016

(54) BEATING SIGNAL MONITORING MODULE, TERAHERTZ WAVE GENERATION DEVICE AND OPTICAL SIGNAL MONITORING DEVICE INCLUDING THE BEATING SIGNAL MONITORING MODULE

(71) Applicant: Electronics and Telecommunications Research Institute, Daejeon (KR)

(72) Inventors: Namje Kim, Daejeon (KR); Sang-Pil Han, Daejeon (KR); Kyung Hyun Park, Daejeon (KR); Han-Cheol Ryu, Daejeon (KR); Hyunsung Ko, Seoul (KR); Jeong Woo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 221 days.

(21) Appl. No.: 14/023,257

(22) Filed: Sep. 10, 2013

(65) Prior Publication Data
US 2014/0175306 A1    Jun. 26, 2014

(30) Foreign Application Priority Data
Dec. 21, 2012    (KR) .......................... 10-2012-0151074

(51) Int. Cl.
*G01T 1/04*    (2006.01)
*G01J 9/04*    (2006.01)

(52) U.S. Cl.
CPC .......................... *G01J 9/04* (2013.01)

(58) Field of Classification Search
CPC .................................................... G01N 21/3581
See application file for complete search history.

(56) References Cited

U.S. PATENT DOCUMENTS

| | | | | |
|---|---|---|---|---|
| 4,703,992 | A * | 11/1987 | Yeh | 359/7 |
| 6,456,380 | B1 * | 9/2002 | Naganuma | 356/450 |
| 7,054,057 | B2 * | 5/2006 | Aso et al. | 359/326 |
| 2002/0105634 | A1 * | 8/2002 | Aoki et al. | 356/73.1 |
| 2006/0204170 | A1 * | 9/2006 | Igarashi et al. | 385/24 |
| 2010/0171952 | A1 * | 7/2010 | DeFlores et al. | 356/327 |
| 2011/0080580 | A1 * | 4/2011 | Fermann et al. | 356/301 |
| 2011/0135301 | A1 * | 6/2011 | Myslinski et al. | 398/34 |

* cited by examiner

*Primary Examiner* — David Porta
*Assistant Examiner* — Mamadou Faye (57) ABSTRACT

The inventive concept relates to a beating signal monitoring module and a terahertz wave generation device and an optical signal monitoring device that including the beating signal monitoring module. The beating signal monitoring module includes a nonlinear unit generating an optical signal including a FWM light in response to a beating signal generated from a first light and a second light; a filter unit separating the FWM light from the optical signal and outputting the separated FWM light; and a monitoring unit monitoring the beating signal using the separated FWM light. The beating signal monitoring module and a terahertz wave generation device and an optical signal monitoring device that including the beating signal monitoring module can effectively monitor a beating signal being generated by two lasers using a Four Wave Mixing signal.

11 Claims, 8 Drawing Sheets

| DC | AC | Beating Signal State |
|---|---|---|
| Normal | Normal | Normal |
| Signal Absent | Signal Absent | Laser Off or Discrepancy of polarization |
| Signal Reduction | Normal | Laser Output Reduction or Discrepancy of polarization |
| Signal Reduction | Signal Increase | Noise Increase |
| Normal | Signal Increase | Noise Increase |

BEATING SIGNAL MONITORING MODULE, TERAHERTZ WAVE GENERATION DEVICE AND OPTICAL SIGNAL MONITORING DEVICE INCLUDING THE BEATING SIGNAL MONITORING MODULE

CROSS-REFERENCE TO RELATED APPLICATIONS

This U.S. non-provisional patent application claims priority under 35 U.S.C. §119 of Korean Patent Application No. 10-2012-0151074, filed on Dec. 21, 2012, the entire contents of which are hereby incorporated by reference.

BACKGROUND

The present inventive concept herein relates to a beating signal monitoring module, and a terahertz wave generation device and an optical signal monitoring device that include the beating signal monitoring module.

A terahertz wave is an electromagnetic wave having a frequency between a micro-wave and an infrared light. As a technology for generating a terahertz wave, a method of using a beating signal and photo mixer is recently being studied.

A beating signal is generated by beating two lights having different frequencies from each other generated from two lasers. The generated beating signal is input to a photo mixer. The beating signal being input is absorbed into an activation layer of the photo mixer and generates photo carrier pairs. The generated carriers generate photoelectric current while being moved by an external bias voltage.

A frequency of the photoelectric current is determined in response to a frequency of the beating signal being provided. An electromagnetic, that is, a terahertz wave is emitted in response to the generated photoelectric current. To control a frequency and amplitude of the terahertz wave, a characteristic (e.g., a frequency, a polarization and amplitude) of the two lights generating the beating signal has to be monitored.

SUMMARY

Embodiments of the inventive concept provide a beating signal monitoring module. The beating signal monitoring module may include a nonlinear unit generating an optical signal including a FWM light in response to a beating signal generated from a first light and a second light; a filter unit separating the FWM light from the optical signal and outputting the separated FWM light; and a monitoring unit monitoring the beating signal using the separated FWM light.

Embodiments of the inventive concept also provide a terahertz wave generation device. The terahertz wave generation device may include a beating signal generation module generating a beating signal from a first light and a second light; a beating signal monitoring module monitoring the beating signal; and a photo mixer module generating a terahertz wave using the beating signal. The beating signal monitoring module comprises a nonlinear unit generating an optical signal including a FWM light in response to the beating signal; a filter unit separating the FWM light from the optical signal; and a monitoring unit monitoring the beating signal using the FWM light.

Embodiments of the inventive concept also provide an optical signal monitoring device. The optical signal monitoring device may include an external optical signal input module being provided with an external optical signal from the outside; a reference laser generating a reference light and beating the external optical signal and the reference light to generate a beating signal; and a beating signal monitoring module monitoring the beating signal. The beating signal monitoring module comprises: a nonlinear unit generating an optical signal including a FWM light in response to the beating signal; a filter unit separating the FWM light from the optical signal; and a monitoring unit analyzing the external optical signal using a result that the beating signal is monitored using the FWM light.

BRIEF DESCRIPTION OF THE FIGURES

Preferred embodiments of the inventive concept will be described below in more detail with reference to a accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Embodiments of inventive concepts will be described more fully hereinafter with reference to a accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Figure 1:
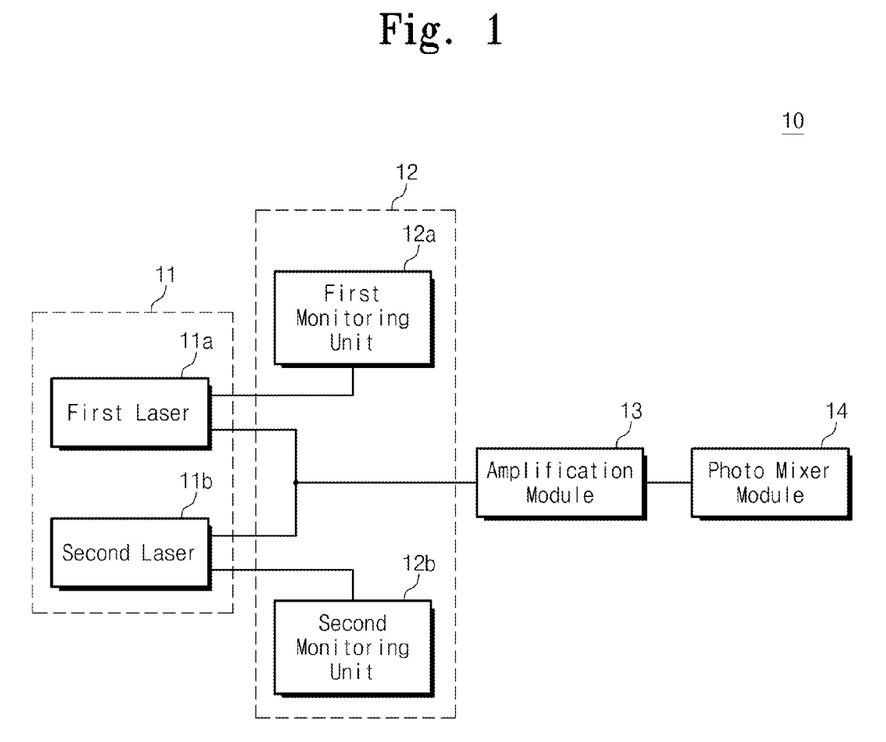
FIG. 1 is a block diagram illustrating a terahertz generation device including a beating signal monitoring module.

FIG. 1 is a block diagram illustrating a terahertz generation device including a beating signal monitoring module. Referring to FIG. 1, a terahertz wave generation device 10 includes a beating signal generation module 11, a beating signal monitoring module 12, an amplification module 13 and a photo mixer module 14.

The beating signal generation module 11 includes a first laser 11a and a second laser 11b. The beating signal generation module 11 generates a beating signal using the first laser 11a and the second laser 11b.

The first laser 11a generates a first light having a first frequency. The second laser 12a generates a second light having a second frequency. The first and second lights are beated to be output as a beating signal. A frequency of the beat signal is determined in response to a frequency difference between the first and second lights. As polarizations of the first and second lights are the same, a beating efficiency of the beating signal increases.

The amplification module 13 amplifies the beating signal provided from the beating signal generation module 11. The amplification module 13 provides the amplified beating signal to the photo mixer module 14.

The photo mixer module 14 generates a terahertz wave using the amplified beating signal. A frequency of the terahertz wave is determined in response to a frequency of the provided beating signal. That is, a frequency of the terahertz wave is determined in response to a frequency difference between the first and second lights. To provide a terahertz wave having stable output amplitude and a stable frequency, amplitude, a frequency and a polarization of the first and second lights have to be able to be controlled.

The beating signal monitoring module 12 monitors first and second lights. The beating signal monitoring module 12 includes a first monitoring unit 12a and a second monitoring unit 12b.

The first monitoring unit 12a is connected to the first laser 11a to receive a first light. The first monitoring unit 12a monitors amplitude and a frequency of the first light. The second monitoring unit 12b is connected to the second laser 11b to receive a second light. The second monitoring unit 12b monitors amplitude and a frequency of the second light.

The beating signal monitoring module 12 described above is connected to the first and second lasers 11a and 11b to monitor the first and second lights. A result monitored in the beating signal monitoring module 12 can be fed back to the beating signal generation device 11.

The terahertz generation device 10 described above monitors the first and second lights using the beating signal monitoring module 12 to provide a terahertz wave having a stable output and a stable frequency.

Figure 2:
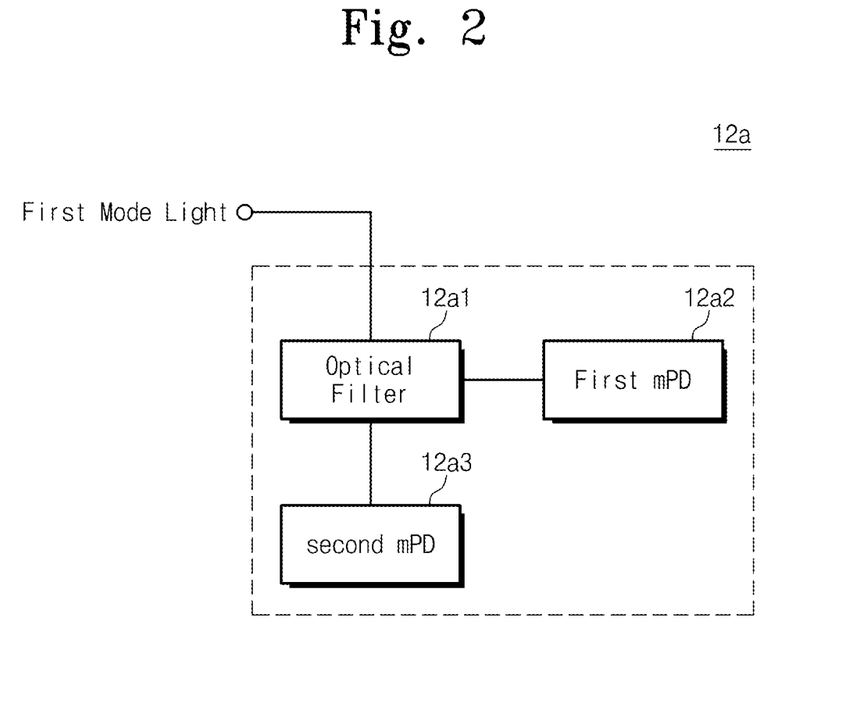
FIG. 2 is a block diagram illustrating a first monitoring unit of FIG. 1 in detail.

FIG. 2 is a block diagram illustrating a first monitoring unit of FIG. 1 in detail. The first monitoring unit 12a may have the same constitution and the same operation principle as the second monitoring unit 12b. Referring to FIG. 2, the first monitoring unit 12a includes an optical filter 12a1, a 1 mPD 12a2 (monitoring photodiode) and a 2 mPD 12a3.

The optical filter 12a1 is provided with the first light from the first laser 11a. The optical filter 12a1 reflects a unit of the first light and transmits the other unit of the first light in response to a frequency of the provided first light.

The 1 mPD 12a2 measures the first light reflected from the optical filter 12a1. The 2 mPD 12a3 measures the first light transmitted through the optical filter 12a1. Using a ratio of measured results of the 1 mPD 12a2 and the 2 mPD 12a3, a frequency and amplitude of the first light may be monitored.

The first monitoring unit 12a may be connected to the first laser 11a to monitor a frequency and amplitude of the first light. Information of the first light monitored in the first monitoring unit 12a may be fed back to the first laser 11a.

Figure 3:
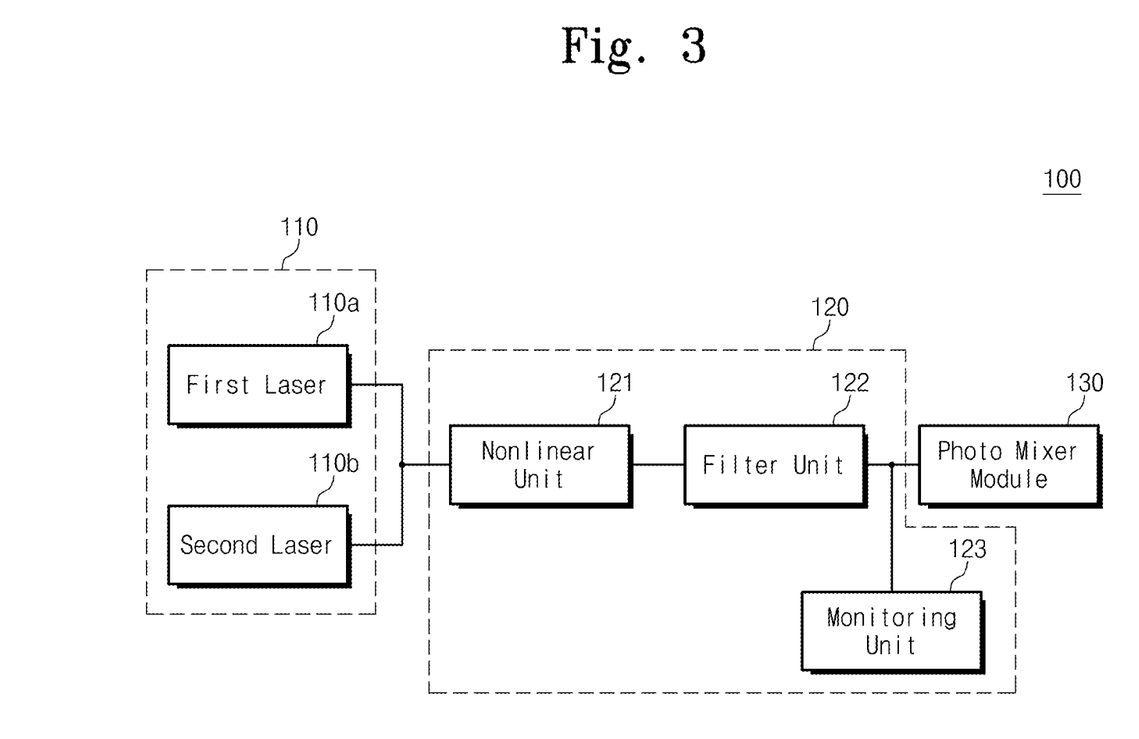
FIG. 3 is a block diagram illustrating a terahertz wave generation device including a beating signal monitoring module in accordance with some embodiments of the inventive concept.

FIG. 3 is a block diagram illustrating a terahertz wave generation device including a beating signal monitoring module in accordance with some embodiments of the inventive concept. Referring to FIG. 3, the terahertz wave generation device 100 includes a beating signal generation module 110, a beating signal monitoring module 120 and a photo mixer module 130.

The terahertz wave generation device 100 can directly monitor a beating signal instead of monitoring each light using a FWM light. Using a FWM light, the terahertz wave generation device 100 can monitor not only a frequency of each light but also the degree of discrepancy of polarization and whether a noise exists or not.

The beating signal generation module 110 and the photo mixer module 130 may have the same constitution and operation principle as the beating signal generation module 11 and the photo mixer module 14 of FIG. 1.

The beating signal monitoring module 120 generates a FWM light in response to a beating signal and can monitor a beating signal using the generated FWM light. The beating signal monitoring module 120 includes a nonlinear unit 121, a filter unit 122 and a monitoring unit 123.

The nonlinear unit 121 is an optical amplifier having a nonlinear characteristic. The nonlinear unit 121 may be a semiconductor optical amplifier (SOA). The nonlinear unit 121 may be an erbium-doped fiber amplifier (EDFA). However, that is only illustration and a constitution of the nonlinear unit 121 is not limited thereto. The nonlinear unit 121 generates an optical signal including a FWM light using a beating signal.

Figure 4:
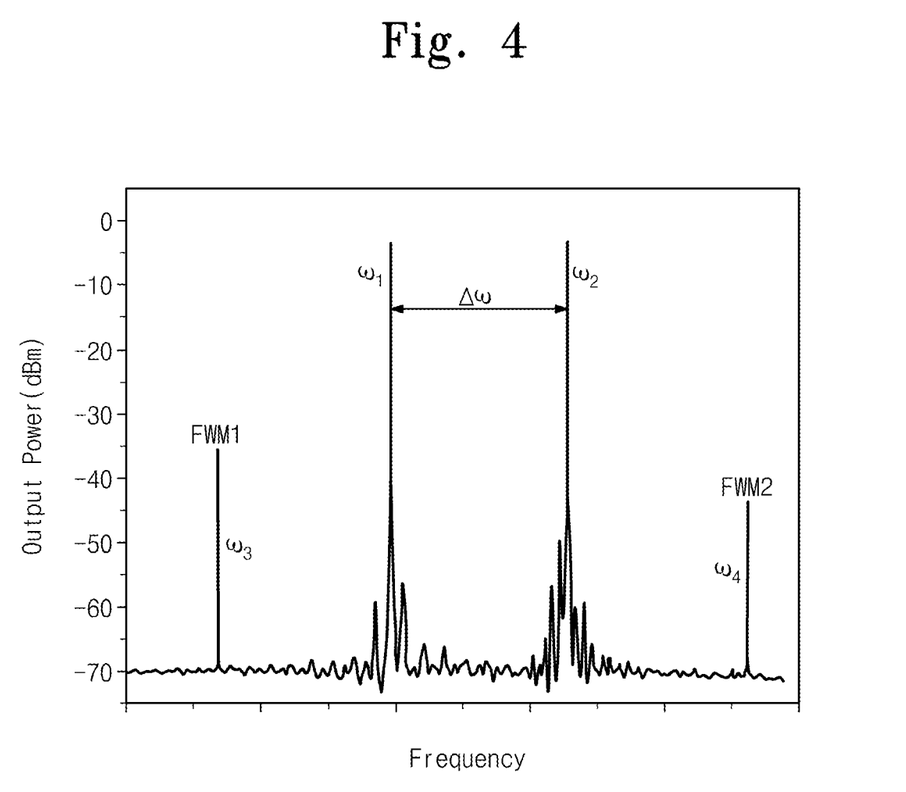
FIG. 4 is a graph illustrating an optical signal being generated from a nonlinear unit of FIG. 3.

FIG. 4 is a graph illustrating an optical signal being generated from a nonlinear unit of FIG. 3. In FIG. 4, a horizontal axis represents a frequency and a vertical axis represents an output power.

A beating signal being input to the nonlinear unit 121 is a dual-mode optical signal having a first frequency w1 of the first light and a second frequency w2 of the second light. If two optical signals having different frequencies from each other enter a material having a nonlinear characteristic, new two optical signal is generated in response to the frequencies of the two optical signals by a four-wave mixing (FWM) phenomenon. If we call the generated two optical signals a 1 FWM light and a 2 FWM light, frequencies w3 and w4 of the 1 and 2 FWM lights may be expressed by mathematical formulas 1 and 2.

$$w3=w1-\Delta w \qquad \text{[mathematical formula 1]}$$

$$w4=w2+\Delta w \qquad \text{[mathematical formula 2]}$$

In the mathematical formulas 1 and 2, $\Delta w$ represents a difference between the first frequency w1 and the second frequency w2 of the entered beating signal.

As shown in the mathematical formulas 1 and 2, frequencies of the 1 FWM light and the 2 FWM light are determined in response to a difference between the two frequencies of the beating signal. Amplitude of the 1 and 2 FWM lights is determined in response to an input strength of the first and second lights, an identity of polarization of the first and second lights and the degree of noises that exist in the first and second lights. That is, a condition that a FWM light having a large amplitude is generated coincides with a condition that a beating signal having a high efficiency is generated. Thus, if using a FWM light, the same result as monitoring a beating signal may be obtained.

Referring back to FIG. 3, the nonlinear unit 121 provides an optical signal including a FWM light to the filter unit 122 in response to a beating signal.

The filter unit 122 filters the optical signal provided from the nonlinear unit 121 to separate the 1 FWM light from the optical signal. The filter unit 122 may be a low pass filter (LPF). The filter unit 122 may provide the 1 FWM light to the monitoring unit 123 and may provide the rest optical signal to the photo mixer module 130. The filter unit 122 may be a band pass filter (BPF). The filter unit 122 may provide the 1 FWM light to the monitoring unit 123 and may provide the beating signal to the photo mixer module 130.

The monitoring unit 123 monitors the provided 1 FWM light. The monitoring unit 123 can monitor the 1 FWM light to measure the degree of discrepancy of polarization of the first and second lights, the degree of noises that exist in the first and second lights, frequencies of the first and second lights and amplitude of the first and second lights. An operation of the monitoring unit 123 will be described in further detail with reference to FIG. 5.

The photo mixer module 130 generates a terahertz wave in response to the optical signal provided from the filter unit 122. A frequency of the terahertz wave is determined by a frequency difference (Δw) of the beating signal included in the optical signal. Since a frequency of the 2 FWM light included in the optical signal is higher than the range of identification frequency of the photo mixer module 130, the 2 FWM light does not affect the terahertz wave.

Using the FWM light generated from the beating signal, the terahertz wave generation device 100 can measure the degree of discrepancy of polarization of the first and second lights, the degree of noises that exist in the first and second lights, frequencies of the first and second lights and amplitude of the first and second lights. The beating signal monitoring module 120 of the terahertz wave generation device 100 can be realized with a small area and small complexity because it does not need to monitor each optical signal. Since beating signal monitoring module 120 of the terahertz wave generation device 100 directly monitors the beating signal without needing to be connected to each laser, it can monitor the beating signal even when two lasers are integrated and thereby it is efficient.

Figure 5:
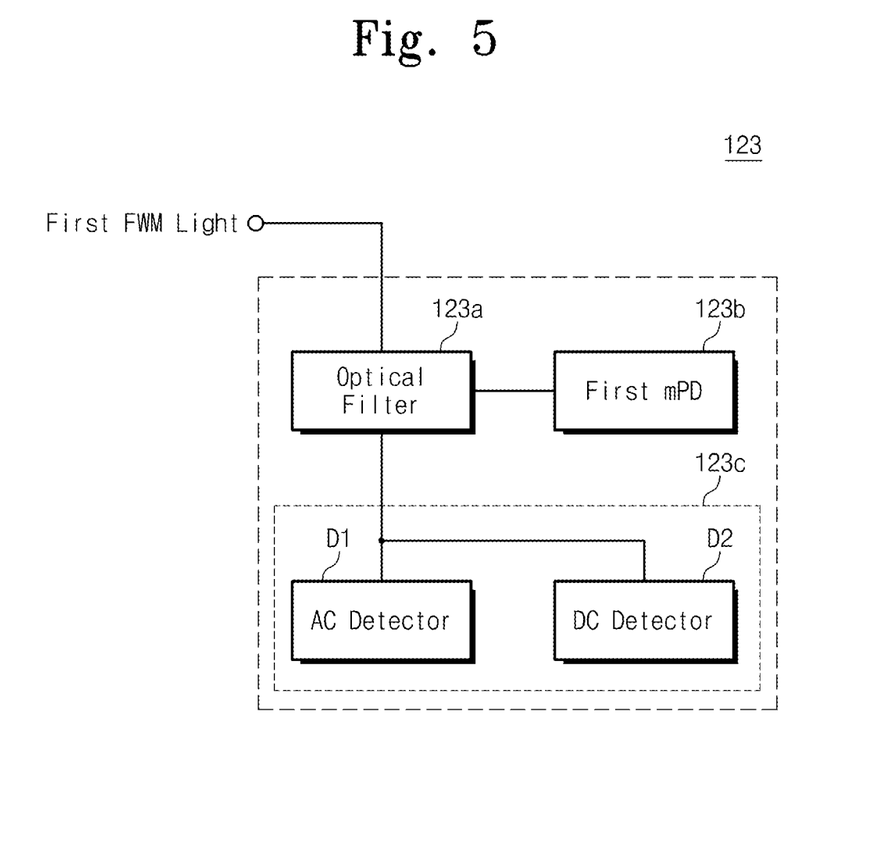
FIG. 5 is a block diagram illustrating a monitoring unit of FIG. 3 in further detail.

FIG. 5 is a block diagram illustrating a monitoring unit 123 of FIG. 3 in further detail. Referring to FIG. 5, the monitoring unit 123 includes an optical filter 123a, a 1 mPD 123b and a 2 mPD 123c.

The optical filter 123a is provided with the 1 FWM light from the filter unit 122 of FIG. 4. The optical filter 123a reflects a unit of the 1 FWM light and transmits the other unit of the 1 FWM light.

The 1 mPD 123b measures the 1 FWM light reflected from the optical filter 123a. The 2 mPD 123c measures the 1 FWM light transmitted through the optical filter 123a. Using a ratio of measured results of the 1 mPD 123b and the 2 mPD 123c, a frequency and amplitude of the 1 FWM light can be monitored.

When tuning the beating signal by changing a frequency of the second light while fixing a frequency of the first light, a frequency change of the second light coincides with a frequency change of the 1 FWM light. Thus, a tuning frequency of the second light may be determined in response to a frequency monitoring result of the second light.

Amplitude of the 1 FWM light is determined in response to the degree of discrepancy of polarization and amplitude of the first and second lights. When amplitude of the 1 FWM light is small even if output amplitude of the second light is changed in response to an amplitude monitoring result of the 1 FWM light, it may be judged that polarization of the first and second lights does not coincide with each other.

The 2 mPD 123c includes an AC detector D1 and a DC detector D2. The 2 mPD 123c separates an AC component and a DC component of the 1 FWM light and monitors them using the AC detector D1 and the DC detector D2. Using the 1 mPD 123b and the AC detector D1 and the DC detector D2 of the 2 mPD 123c, the degree of discrepancy of polarization of the first and second lights and the degree of noises that exist in the first and second lights may be monitored.

The AC detector D1 measures an AC component of the 1 FWM light. The AC detector D1 measures amplitude of the whole AC current. An AC component of the 1 FWM light being measured in the AC detector D1 represents a noise component of the beating signal. With reference to a measurement result of the AC detector D1, the degree of a noise include in the beating signal can be measured.

The DC detector D2 measures a DC component of the 1 FWM light. Using a ratio of the DC component of the 1 FWM light measured in the DC detector D2 and a measurement result of the 1 mPD 123b, a frequency and amplitude of the 1 mPD 123b can be monitored.

Figure 6:
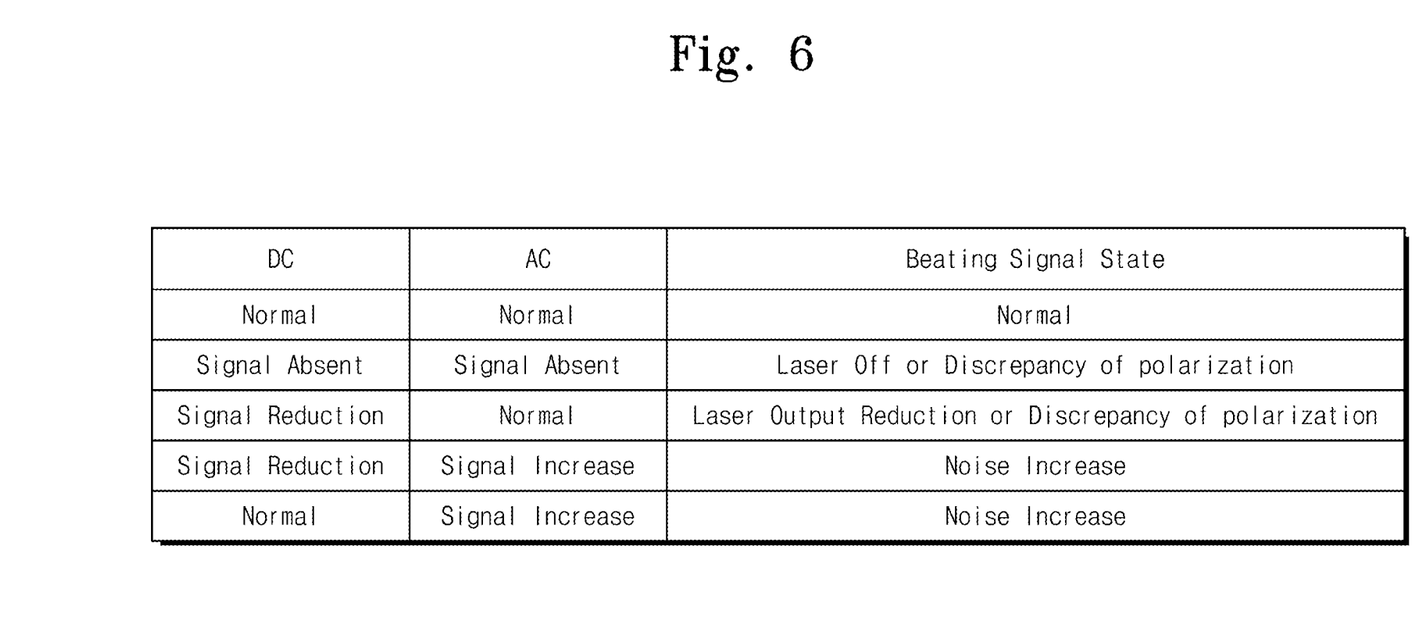
FIG. 6 is a table illustrating a state of a beating signal judged with reference to a DC component of a 1 FWM light measured at 1 mPD and a second mPD and an AC component of the 1 FWM light measured at an AC detector.

FIG. 6 is a table illustrating a state of a beating signal judged with reference to a DC component of a 1 FWM light measured at 1 mPD 123b and a second mPD 123c and an AC component of the 1 FWM light measured at an AC detector D1.

Referring to FIG. 6, in the case that the DC component and the AC component are monitored as a reference value, the beating signal is judged to be a normal signal. In the case that the DC component and the AC component are not monitored, it is judged that the first laser or the second laser is turned off or polarization of the first and second lights does not greatly coincide with each other. In the case that the DC component is monitored to have a value smaller than the reference value and the AC component is monitored to have the reference value, it may be judged that outputs of the first and second lights are reduced as compared with a normal value or polarization of the first and second lights does not coincide with each other. In the case that the DC component is monitored to be reduced or have the reference value and the AC component is monitored to have a value greater than the reference value, it may be judged that noise components of low frequency are included a lot in the beating signal.

Like the table described above, using the DC component and the AC component of the 1 FWM light, further detail information (e.g., the degree of coincidence of polarization or the degree of noises that exist in the beating signal) about the beating signal may be monitored. The monitored information can be fed back to the beating signal generation module 110.

Figure 7:
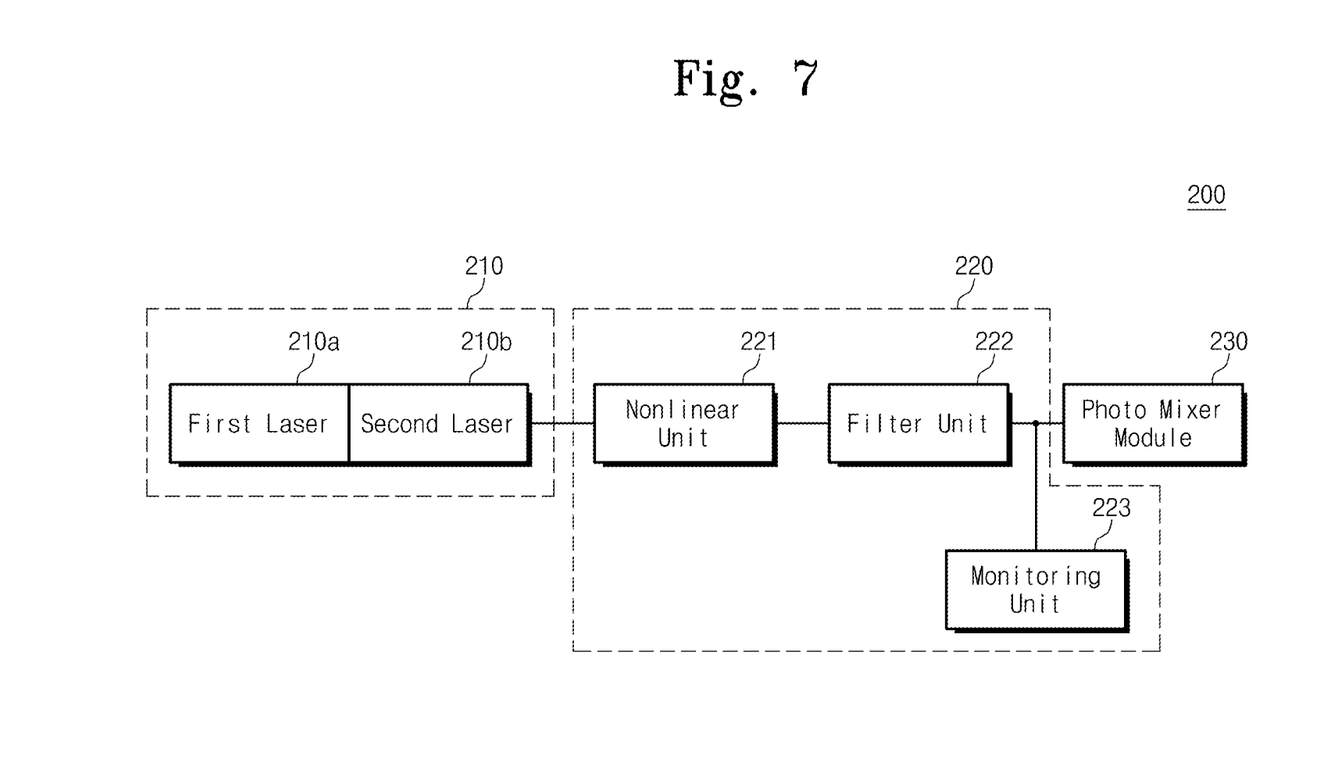
FIG. 7 is a block diagram illustrating a terahertz wave generation device in accordance with some other embodiments of the inventive concept.

FIG. 7 is a block diagram illustrating a terahertz wave generation device in accordance with some other embodiments of the inventive concept. Referring to FIG. 7, the terahertz wave generation device 200 includes a beating signal generation module 210, a beating signal monitoring module 220 and a photo mixer module 230. The beating signal monitoring module 220 and the photo mixer module 230 may have the same constitution and operation principle as the beating signal monitoring module 120 and the photo mixer module 130 of FIG. 3.

The beating signal generation module 210 includes a first laser 210a and a second laser 210b that are integrated to be one module. The first and second lasers 210a and 210b may be a distributed feedback laser (DFB) laser. The first laser 210a and a second laser 210b are collinearly integrated. The first laser 210a provides a first light having a first wavelength. The second laser 210b provides a second light having a second wavelength.

A phase control area may be formed between the first laser 210a and the second laser 210b. Since the first and second lasers 210a and 210b are collinearly integrated, the first light and the second light interact with each other. The phase control area can control an interaction between the first and second lights by controlling phases of the first and second lights.

Each of the first and second lasers 210a and 210b may be connected to a micro-heater. A wavelength of a semiconductor laser is changed in response to a change of temperature. Thus, the first and second wavelengths may be controlled in response to a control of temperature by the micro-heater. The beating signal generation module 210 can continuously provide a light having a stable dual mode (a first wavelength mode and a second wavelength mode) in both directions. Using the micro-heater, a wavelength of the dual mode light being provided from the beating signal generation module 210 can be controlled to a wanted value.

Using a beating signal, the beating signal monitoring module 220 can monitor the first and second lights without needing to be directly connected to each of the first and second lasers 210a and 210b. The terahertz wave generation device 220 including the beating signal monitoring module 220 can perform a monitoring operation on the beating signal generation module 210 that is integrated to be one module and thereby it is efficient.

Figure 8:
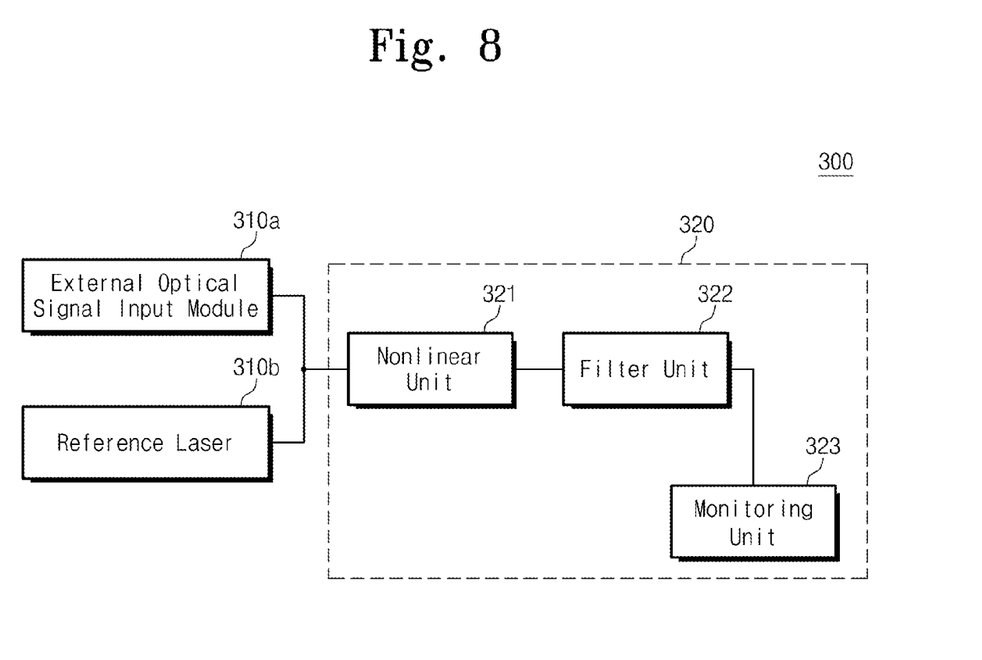
FIG. 8 is a block diagram illustrating an optical signal monitoring device including a beating signal monitoring module in accordance with some embodiments of the inventive concept.

FIG. 8 is a block diagram illustrating an optical signal monitoring device including a beating signal monitoring module in accordance with some embodiments of the inventive concept. Referring to FIG. 8, the optical signal monitoring device 300 includes an external optical signal input module 310a, a reference laser 310b and a beating signal monitoring module 320. The optical signal monitoring device 300 can monitor an external optical signal being provided from the outside using the beating signal monitoring module 320.

The external optical signal input module 310a is provided with an external optical signal from the outside. The external optical signal input module 310a may be connected to an optical fiber or an optical cable for being provided with an external optical signal.

The reference laser 310b generates a reference light having a first wavelength. The reference laser 310b may be a DFB laser. A reference light generated from the reference laser 310b and an external optical signal provided from the external optical signal input module 310a are beated to generate a beating signal.

The beating signal monitoring module 320 may have the same constitution and operation principle as the beating signal monitoring module 220 of FIG. 7. The beating signal monitoring module 320 can monitor the beating signal generated from the reference light and the external optical signal to analyze amplitude, a wavelength and a polarization of the external optical signal. The beating signal monitoring module 320 can feed a monitored result back to the reference laser 310b.

A beating signal monitoring module and a terahertz wave generation device including the beating signal monitoring module can effectively monitor a beating signal being generated by two lasers using a four wave mixing (FWM) signal.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A beating signal monitoring module comprising:
    a nonlinear unit generating an optical signal including a FWM light in response to a beating signal generated from a first light and a second light;
    a filter unit separating the FWM light from the optical signal and outputting the separated FWM light; and
    a monitoring unit monitoring the beating signal using the separated FWM light,
    wherein the FWM light comprises:
        a first FWM light having a first frequency lower than frequencies of the first and second lights; and
        a second FWM light having a second frequency higher than the frequencies of the first and second lights,
    wherein the filter unit separates the first FWM light from the optical signal and provides the first FWM light to the monitoring unit, and
    wherein the monitoring unit monitors a frequency difference between the first and second lights using the first FWM light.

2. The beating signal monitoring module of claim 1, wherein the monitoring unit further monitors a degree of discrepancy of polarization of the first and second lights using the first FWM light.

3. The beating signal monitoring module of claim 1, wherein the monitoring unit further monitors a degree of noises included in the beating signal using the first FWM light.

4. The beating signal monitoring module of claim 1, wherein the monitoring unit further monitors states of the first and second lights using the first FWM light.

5. The beating signal monitoring module of claim 1, wherein the monitoring unit comprises:
    an optical filter reflecting and transmitting the first FWM light according to a frequency of the first FWM light;
    a first monitoring unit measuring amplitude of the reflected FWM light; and
    a second monitoring unit measuring amplitude of the transmitted FWM light.

6. The beating signal monitoring module of claim 5, wherein the second monitoring unit comprises:
    an AC detector measuring amplitude of AC component of the transmitted FWM light; and
    a DC detector measuring amplitude of DC component of the transmitted FWM light.

7. The beating signal monitoring module of claim 1, wherein the nonlinear unit is a semiconductor optical amplifier.

8. A terahertz wave generation device comprising:
    a beating signal generation module generating a beating signal from a first light and a second light;
    a beating signal monitoring module monitoring the beating signal; and
    a photo mixer module generating a terahertz wave using the beating signal,
    wherein the beating signal monitoring module comprises:
        a nonlinear unit generating an optical signal including a FWM light in response to the beating signal;
        a filter unit separating the FWM light from the optical signal; and
        a monitoring unit monitoring the beating signal using the separated FWM light,
    wherein the FWM light comprises:
        a first FWM light having a first frequency lower than frequencies of the first and second lights; and
        a second FWM light having a second frequency higher than the frequencies of the first and second lights,
    wherein the filter unit separates the first FWM light from the optical signal and provides the first FWM light to the monitoring unit, and
    wherein the monitoring unit monitors a degree of noises included in the beating signal using the first FWM light.

9. The terahertz wave generation device of claim 8, wherein the beating signal generation module comprises:

a first laser generating the first light; and
a second laser generating the second light,
wherein the first and second lasers are collinearly integrated.

10. The terahertz wave generation device of claim 8, wherein the monitoring unit monitors a frequency difference between the first and second lights using the first FWM light, a degree of coincidence of polarization of the first and second lights, or states of the first and second lights.

11. An optical signal monitoring device comprising:
an external optical signal input module being provided with an external optical signal from the outside;
a reference laser generating a reference light and beating the external optical signal and the reference light to generate a beating signal; and
a beating signal monitoring module monitoring the beating signal,
wherein the beating signal monitoring module comprises:
a nonlinear unit generating an optical signal including a FWM light in response to the beating signal;
a filter unit separating the FWM light from the optical signal; and
a monitoring unit analyzing the external optical signal using a result that the beating signal is monitored using the separated FWM light,
wherein the FWM light comprises:
a first FWM light having a first frequency lower than frequencies of the external optical signal and the reference light;
a second FWM light having a second frequency higher than the frequencies of the external optical signal and the reference light,
wherein the filter unit separates the first FWM light from the optical signal and provides the first FWM light to the monitoring unit, and
wherein the monitoring unit monitors a degree of noises included in the beating signal using the first FWM light.

* * * * *